US010225315B2

(12) United States Patent
Gao

(10) Patent No.: US 10,225,315 B2
(45) Date of Patent: Mar. 5, 2019

(54) METHOD AND SYSTEM FOR ACQUIRING WEB PAGES

(71) Applicant: Alibaba Group Holding Limited, George Town (KY)

(72) Inventor: Shanyuan Gao, Hangzhou (CN)

(73) Assignee: Alibaba Group Holding Limited (KY)

( * ) Notice: Subject to any disclaimer, the term of this patent is extended or adjusted under 35 U.S.C. 154(b) by 559 days.

(21) Appl. No.: 14/712,527

(22) Filed: May 14, 2015

(65) Prior Publication Data

US 2015/0341414 A1 Nov. 26, 2015

(30) Foreign Application Priority Data

May 20, 2014 (CN) .......................... 2014 1 0213336

(51) Int. Cl.
| | | |
|---|---|---|
| *G06F 15/16* | (2006.01) | |
| *H04L 29/08* | (2006.01) | |
| *H04L 29/12* | (2006.01) | |
| *H04L 12/803* | (2013.01) | |

(52) U.S. Cl.
CPC .............. *H04L 67/02* (2013.01); *H04L 29/08* (2013.01); *H04L 47/125* (2013.01); *H04L 61/1511* (2013.01); *H04L 61/2007* (2013.01); *H04L 67/1002* (2013.01); *H04L 67/1004* (2013.01); *H04L 67/34* (2013.01); *H04L 67/2804* (2013.01)

(58) Field of Classification Search
CPC ........ H04L 67/02; H04L 29/08; H04L 47/125
USPC ....................................................... 709/203
See application file for complete search history.

(56) References Cited

U.S. PATENT DOCUMENTS

| | | | |
|---|---|---|---|
| 7,970,876 B2 | 6/2011 | Sadot et al. | |
| 8,171,124 B2* | 5/2012 | Kondamuru | .......... G06F 9/5083 |
| | | | 709/203 |
| 8,316,085 B2* | 11/2012 | Jeon | .................. H04L 29/12066 |
| | | | 709/203 |
| 8,504,721 B2 | 8/2013 | Hsu et al. | |
| 8,699,336 B2* | 4/2014 | Huo | ........................ H04L 43/16 |
| | | | 370/230.1 |
| 9,137,302 B1* | 9/2015 | Makhijani | ........... H04L 67/1002 |
| 2004/0019659 A1* | 1/2004 | Sadot | ...................... H04L 29/06 |
| | | | 709/219 |
| 2007/0233851 A1 | 10/2007 | Ma et al. | |
| 2010/0011126 A1* | 1/2010 | Hsu | ..................... H04L 67/1008 |
| | | | 709/249 |
| 2010/0042743 A1* | 2/2010 | Jeon | .................. H04L 29/12066 |
| | | | 709/238 |

(Continued)

*Primary Examiner* — Vivek Srivastava
*Assistant Examiner* — Atta Khan
(74) *Attorney, Agent, or Firm* — Van Pelt, Yi & James LLP

(57) ABSTRACT

Acquiring web pages includes acquiring a hypertext transfer protocol (HTTP) request including a first Internet protocol (IP) address, looking up a web page basic framework corresponding to the first IP address, obtaining a plurality of domain names of a plurality of pieces of web page-referenced content corresponding to the first IP address, sending a domain name resolution request to a global load balancer (GSLB), wherein the domain name resolution request includes the plurality of domain names of the plurality of pieces of web page-referenced content, acquiring a plurality of second IP addresses of the plurality of pieces of web page-referenced content, and sending the web page basic framework and the plurality of second IP addresses of the plurality of pieces to a browser.

18 Claims, 15 Drawing Sheets

(56) References Cited

U.S. PATENT DOCUMENTS

| | | |
|---|---|---|
| 2010/0131639 A1 | 5/2010 | Narayana et al. |
| 2011/0153938 A1* | 6/2011 | Verzunov ............. G06F 9/5083 |
| | | 711/118 |
| 2011/0202632 A1 | 8/2011 | Martin |
| 2012/0054266 A1* | 3/2012 | Kazerani ............ H04L 41/5067 |
| | | 709/203 |
| 2013/0046876 A1* | 2/2013 | Narayana ........... H04L 67/1027 |
| | | 709/223 |
| 2014/0059248 A1* | 2/2014 | Leighton ............ G06F 17/3089 |
| | | 709/245 |
| 2014/0258536 A1 | 9/2014 | Chiong |
| 2015/0106523 A1* | 4/2015 | Cui .................... H04L 67/1036 |
| | | 709/226 |

* cited by examiner

600

METHOD AND SYSTEM FOR ACQUIRING WEB PAGES

CROSS REFERENCE TO OTHER APPLICATIONS

This application claims priority to People's Republic of China Patent Application No. 201410213336.6 entitled A METHOD, A SYSTEM, A WEB SERVER, A BROWSER, AND A GSLB FOR ACQUIRING WEB PAGES, filed May 20, 2014 which is incorporated herein by reference for all purposes.

FIELD OF THE INVENTION

The present application relates to a method and a system for acquiring web pages.

BACKGROUND OF THE INVENTION

As network communications technologies develop, various kinds of information become accessible by browsing various web pages provided by various websites. A new network framework layer, a Content Delivery Network (CDN) has been added to the Internet to allow web pages to open faster. The CDN publishes content of a web page to the network "edge" that is closest to a user. Consequently, the user can obtain web page content from a closer web server, which increases a response speed in accessing the web page. Currently, web pages are typically composed of web page basic frameworks and web page-referenced content (such as cascading style sheets (CSS), JavaScript, photographs, video, etc.). To expedite content delivery of a CDN, the web page-referenced content uses different domain names than the web page basic frameworks. At the same time, to avoid restrictions on concurrent access of a single domain name, the different web page-referenced content uses different domain names. For example, the domain names of the web page-referenced content include static.excdn.cn, img01.excdn.cn, img02.excdn.cn, js.excdn.cn, and vedio-.excdn.cn. Therefore, conventionally, when a web page is acquired, the web page basic framework constituting the web page is acquired based on a domain name of the web page basic framework, and each web page-referenced content forming the web page is acquired based on a domain name of the each web page-referenced content constituting the web page.

FIG. 1 is a flowchart of a conventional process for acquiring web pages. The conventional process includes the following: a browser acquires a web page domain name (e.g., www.example.com) of a to-be-accessed web page. After finding that a present location (the browser itself and the operating system (OS)) has not cached an Internet Protocol (IP) address corresponding to the web page domain name, the browser sends a domain name resolution request including the web page domain name to a local Domain Name Server (DNS) (1A). The local DNS receives the domain name resolution request. After determining that the local DNS itself has not cached an IP address corresponding to the web page domain name, the IP address corresponding to the web page domain name is acquired through a root DNS and a global server load balancer (GSLB), and the IP address corresponding to the web page domain name is sent back to the browser (1B). The browser uses the received IP address corresponding to the web page domain name to establish a connection with the web server for the to-be-accessed web page and sends a hypertext transfer protocol (HTTP) request including the IP address to the web server (2A). The web server receives the HTTP request and sends a web page basic framework (2B) corresponding to the IP address back to the browser. The browser receives the web page basic framework sent back by the web server, analyzes the web page basic framework, obtains domain names of multiple web page-referenced content, issues domain name resolution requests including the domain names of the web page-referenced content (each domain name resolution request including a domain name of one corresponding web page-referenced content), and obtains the IP addresses of the web page-referenced content (similar to 1A and 1B). The browser requests web page-referenced content from the corresponding web page-referenced content server (such as an image-referenced content server) (3A) based on the IP address of the web page-referenced content. The web page-referenced content server sends the web page-referenced content back to the browser (3B). Operations 1A, 1B, 3A, and 3B can be repeated several times. The operations can be repeated as many times as the domain names of the web page-referenced content exist. The browser acquires all the web page-referenced content included in the to-be-accessed web page. The browser combines all the web page-referenced content with the web page basic framework to obtain the web page.

According to the conventional process, when a web page includes multiple web page-referenced content, the browser is to issue domain name resolution requests multiple times and repeat operations 1A, 1B, 3A, and 3B multiple times. Web pages are acquired inefficiently and loaded slowly.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
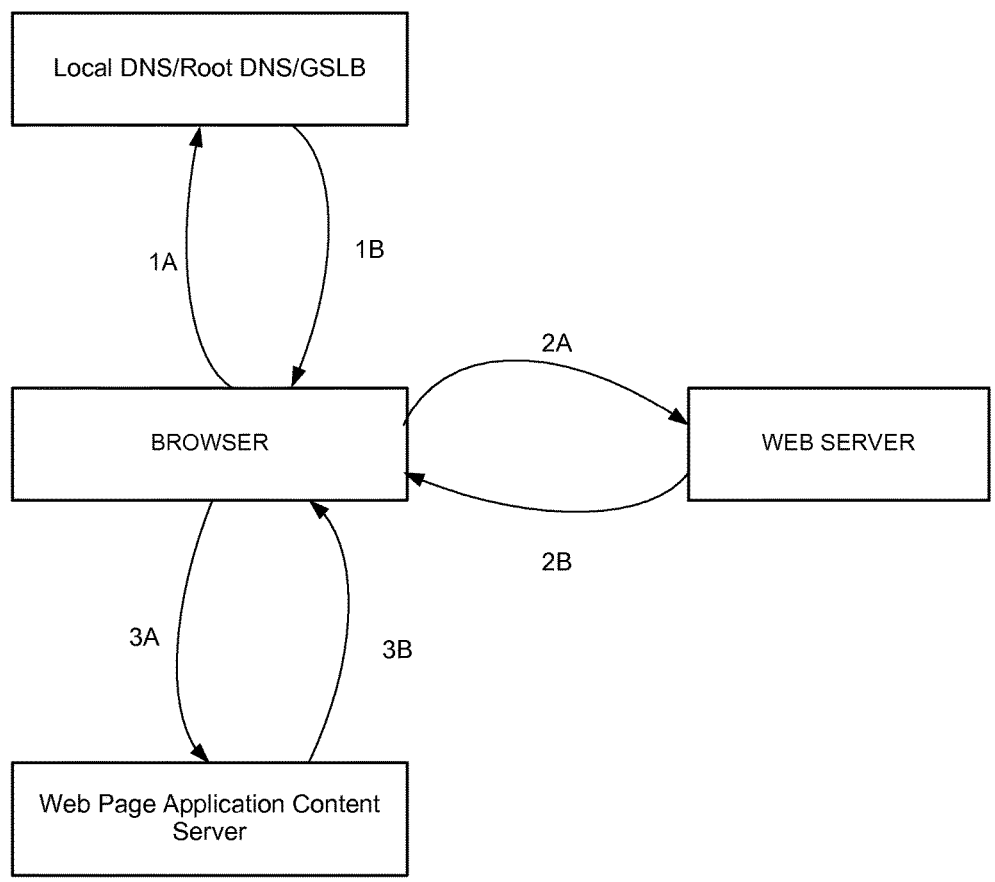
FIG. 1 is a flowchart of a conventional process for acquiring web pages.
Figure 2:
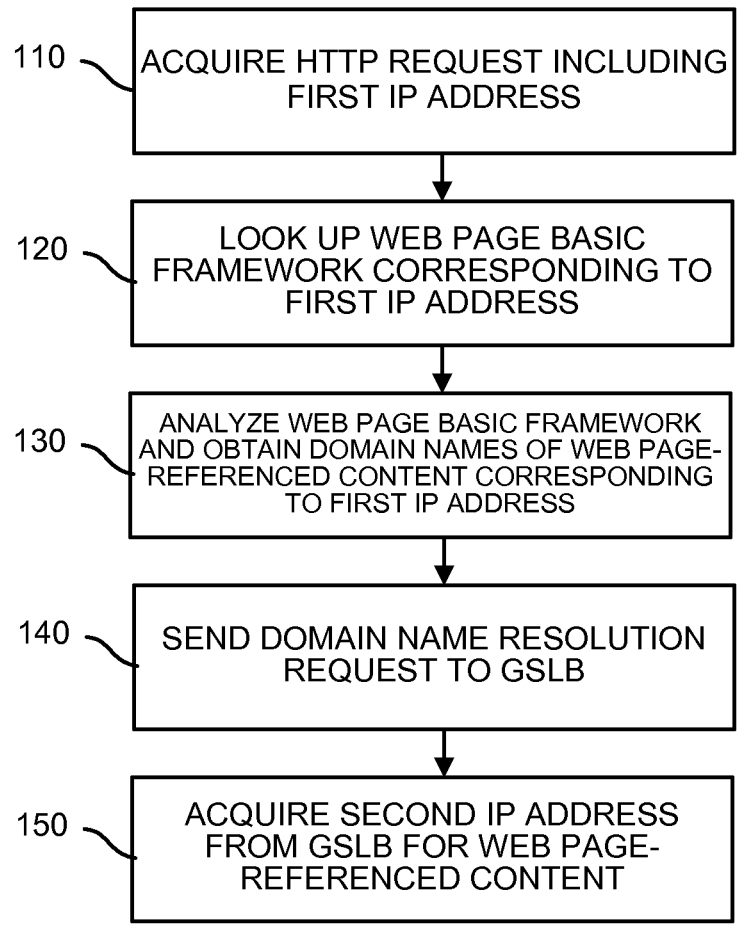
FIG. 2 is a flowchart of an embodiment of a process for acquiring web pages.

FIG. 2 is a flowchart of an embodiment of a process for acquiring web pages. In some embodiments, the process 100 is implemented by the web server 720 of FIG. 7 and comprises:

In 110, the server acquires an HTTP request including a first IP address.

In this example, the HTTP request is issued by a browser executing on a device after the browser acquires the first IP address corresponding to a web page domain name of a to-be-accessed web page. In the following example, a browser is discussed extensively for purposes of example; however, other applications such as standalone applications implementing a browser core or similar functions can also be used to issue the HTTP request.

In this example, to facilitate a subsequent request to a GSLB for resolution of domain names of web page-referenced content, the HTTP request includes a GSLB address. As used herein, a GSLB is a load balancer used to balance load among content servers from different regions in a CDN. The GSLB selects a server to service the customer based on distance to the server. In this example, the HTTP request can be a request sent in operation 2 of FIG. 7. For example, the HTTP request corresponds to GET http://www.example.cn/ HTTP/1.0. In other words, the acquiring of the HTTP request including the first IP address comprises: acquiring an HTTP request including a first IP address and a GSLB address. In some embodiments, the GSLB address can correspond to the GSLB address used by the browser to obtain the first IP address corresponding to the web page domain name of the to-be-accessed web page. In the process of acquiring the first IP address corresponding to the web page domain name of the to-be-accessed web page, the browser records the GSLB address that is being used, and then includes the GSLB address in an HTTP request, and sends the HTTP request to the present location. In some embodiments, the present location is a location from which the HTTP request was initiated, such as the true IP address of the browser.

In 120, the server looks up a web page basic framework corresponding to the first IP address. As used herein, the web page basic framework refers to a framework (e.g., a HyperText Markup Language (HTML) file) that when executed obtains additional web page content and forms a web page using the content.

In one example, corresponding relationships between IP addresses and web page basic frameworks are set up in advance. After the first IP address is acquired, the web page basic framework corresponding to the first IP address is obtained by looking up a pre-established correspondence between the IP address and the web page basic framework.

In 130, the server analyzes the web page basic framework and obtains domain names of web page-referenced content corresponding to the first IP address. The web page basic framework includes locations of various content specified by the web page.

In one example, the web page cannot be obtained until the web page basic framework has been combined with the web page-referenced content. In some embodiments, there is more than one piece of web page-referenced content. The one or more domain names of the web page-referenced content that is to be used in the web page basic framework can be obtained by analyzing the web page basic framework. As an example, a web page basic framework is parsed to locate domain names, e.g., <link href="http://img01.excdn.cn/ . . . "><img src=http://img02.excdn.cn/ . . . ">. For example, the domain names of the web page-referenced content include img01.excdn.cn, img02.excdn.cn, static.excdn.cn, etc.

In 140, the server sends a domain name resolution request to a global server load balancer (GSLB), the domain name resolution request including the one or more domain names of the web page-referenced content.

In some embodiments, after receiving the domain name resolution request, the GSLB resolves the one or more domain names of the web page-referenced content. For each web page-referenced content, based on a local CDN's IP address and the GSLB's own scheduling algorithm, the GSLB obtains a second IP address of each web page-referenced content corresponding to a domain name for each web page-referenced content among the one or more domain names of the web page-referenced content. The second IP address is obtained among a plurality of available IP addresses of CDN servers storing the content, selected by the GSLB using a known scheduling algorithm such as round robin or weighted round robin to load balance the CDN servers.

The domain name resolution request can also include a user IP address of the browser that issued the HTTP request. Accordingly, the GSLB receives the domain name resolution request, resolves the one or more domain names of the web page-referenced content, and combines the user IP address and the GSLB's own scheduling algorithm to obtain a second IP address of each web page-referenced content corresponding to a domain name for each web page-cited content among the one or more domain names of the web page-cited content. For example, for a specific user IP address, the GSLB uses a scheduling algorithm (e.g., round robin or weighted round robin) to select an appropriate second IP address. In some embodiments, the GSLB uses the true IP address of the user as a key to find the second IP addresses for the domain (e.g., img01.excdn.cn).

In another example, since what is linked to the present location is the user IP address of the browser that issued the HTTP request, i.e., the user's browser's true IP address (if the user's browser is linked to the present location through another server, then the true IP address of the user can be obtained through the HTTP header X-Forward-For), the present location can transmit the true IP address of the user's browser to the GSLB. In other words, the true IP address of the user is included in the HTTP request.

In yet another example, in resolving the one or more domain names of the web page-referenced content, the GSLB performs one or more resolutions in combination with the user IP address. Because the user IP address is the true IP address of the user for the to-be-accessed page, the second IP address (i.e., the IP address that is closest to the user network "edge") for each web page-referenced content can be obtained. Because the resolution result, i.e., the second IP address of each piece of web page-referenced content, is resolved based on the true IP address of the user, the uncertainty involved in the conventional process is eliminated when a local DNS IP address is sent to a GSLB for reference and resolution.

In some embodiments, when the HTTP request of operation 110 also includes a global load balancer (GSLB) address, the sending of the domain name resolution request to the GSLB comprises: sending a domain name resolution request to the GSLB corresponding to the GSLB address.

In some embodiments, when the HTTP request of operation 110 does not include a GSLB address, the sending of the domain name resolution request to the global load balancer (GSLB) comprises: looking up local GSLB configuration information and obtaining the GSLB address corresponding to the present location, the GSLB configuration information including the GSLB address corresponding to the present location, and then sending a domain name resolution request to the GSLB corresponding to the found GSLB address.

In other words, the GSLB configuration information can be set up in advance locally, and the GSLB address corresponding to the present location can be obtained by looking up the local GSLB configuration information.

In some embodiments, the sending of a domain name resolution request to the global load balancer (GSLB) comprises:

Sending the domain name resolution request to the global load balancer (GSLB) using an extended domain name server (Extension Domain Name System (EDNS) or Hypertext Transfer Protocol (HTTP)).

In 150, the server acquires a second IP address from the GSLB for the web page-referenced content. In some embodiments, a second IP address is received from the GSLB for each web page-referenced content. In some embodiments, the server sends the web page basic framework and the second IP address for the web page-cited content to the browser, causes the browser to acquire the web page and display the web page. For example, after the second IP address is acquired from the GSLB for the web page-referenced content, the web page basic framework and the second IP address of the web page-referenced content can be packaged into the HTTP response sent back to the browser.

As an example, the second IP address of a piece of web page-referenced content img01.excdn.cn can be 223.5.6.7, and the second IP address of another piece of web page referenced content img02.execdn.cn can be 223.5.6.8 or 223.5.6.9. Accordingly, the second IP addresses of the web page-referenced content can be packaged in a self-defined HTTP header, e.g., X-GSLB-INFO: img01.excdn.cn,60,A, 223.5.6.7;img02.excdn.cn,60,A,223.5.6.8|223.5.6.9. The second IP addresses of the web page-referenced content can also be packaged in a web page HTML, e.g., <meta name="X-GSLB-INFO" content=" img01.excdn.cn,60,A, 223.5.6.7;img02.excdn.cn,60,A,223.5.6.8|223.5.6.9"/>.

Moreover, semicolons (;) can be used to divide up multiple resolution results, and commas (,) can be used to divide up multiple fields within a single resolution result. The fields in the above example are, in order: domain name, time to live (TTL), record type, and resolution result. A vertical line (|) can be used to divide multiple resolution results. Any other feasible approach may be employed with no limitation imposed in this regard. In the above example, the second IP address of img01.excdn.cn is 223.5.6.7, and the second IP address of img02.excdn.cn is 223.5.6.8 or 223.5.6.9.

As an example, the web page basic framework and the second IP address(es) of the web page-referenced content are packaged into the HTTP response that is sent back to the browser. After the browser receives the HTTP response, the browser can extract the web page basic framework and the second IP address(es) of the web page-referenced content from the HTTP response using a browser plugin, an ActiveX plugin, a client proxy, etc. Moreover, the extracted web page basic framework and the second IP address of each web page-referenced content can be stored in a browser DNS cache, an operating system DNS cache, a host file, etc. based on the extraction component (e.g., a browser plugin, an ActiveX plugin, a client proxy, etc.) Accordingly, when a subsequent user accesses the same web page, the browser plugin, the ActiveX plugin, the client proxy, etc. can acquire the second IP address of each web page-referenced content from the browser DNS cache, the operating system DNS cache, the host file, etc. and directly send the request to the corresponding second IP addresses and skip the DNS resolution process.

In another example, the browser acquires each web page-referenced content from each web page-referenced content server corresponding to the second IP address of each web page-referenced content and combines the web page basic framework with each web page-referenced content to obtain the web page.

The process 100 includes: after acquiring an HTTP request including a first IP address, the server obtains one or more domain names of the web page-referenced content corresponding to the first IP address, and sends a domain name resolution request directly to a global server load balancer (GSLB). In the event that the web page includes multiple web page-referenced content, the server is not required to issue multiple domain name resolution requests. Rather, the server may send the resolved second IP addresses to the browser in a single HTTP response header or a webpage that is sent in response. The time for acquiring the web page-referenced content is reduced, which increases web page acquisition efficiency and speeds up web page loading. Scheduling based on the true IP address of the user greatly increases scheduling accuracy. DNS resolution is performed through a web server instead of through the traditional client model. Typically, the resolution time between the web server and the GSLB will be less than a client-issued resolution time, and web page loading speed is increased.

Figure 3:
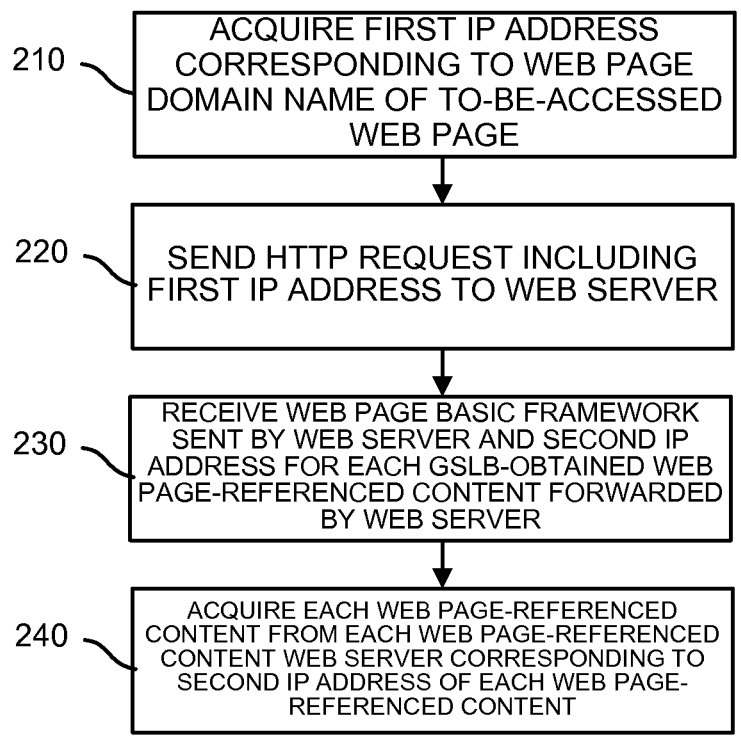
FIG. 3 is a flowchart of another embodiment of a process for acquiring web pages.

FIG. 3 is a flowchart of another embodiment of a process for acquiring web pages. In some embodiments, the process 200 is implemented by the browser 710 of FIG. 7 and comprises:

In 210, the browser acquires a first IP address corresponding to a web page domain name of a to-be-accessed web page.

In 220, the browser sends an HTTP request including the first IP address to a web server.

As an example, after receiving the HTTP request, the web server looks up the web page basic framework corresponding to the first IP address, analyzes the web page basic framework, obtains one or more domain names for web page-cited content corresponding to the first IP address, and sends a domain name resolution request to a global load balancer (GSLB), the domain name resolution request including the one or more domain names of the web page-referenced content.

In some embodiments, after receiving the domain name resolution request, the GSLB resolves the one or more domain names of the web page-referenced content and combines a local CDN IP address with the GSLB's own scheduling algorithm to obtain a second IP address of the web page-referenced content corresponding to a domain name for each web page-referenced content among the one or more domain names of the web page-referenced content.

In some embodiments, the domain name resolution request also includes the local user IP address. Accordingly, after the GSLB receives the domain name resolution request, the GSLB resolves the domain names of the web page-referenced content, combines the user IP address with the GSLB's own scheduling algorithm, and obtains an IP address of each web page-referenced content corresponding to a domain name for each web page-referenced content among the domain names of the web page-referenced content.

In 230, the browser receives a web page basic framework sent by the web server and a second IP address for each GSLB-obtained web page-referenced content forwarded by the web server.

In 240, the browser acquires each web page-referenced content from each web page-referenced content web server corresponding to the second IP address of each web page-referenced content, and combines the web page basic framework with each web page-referenced content to obtain the web page.

Figure 4:
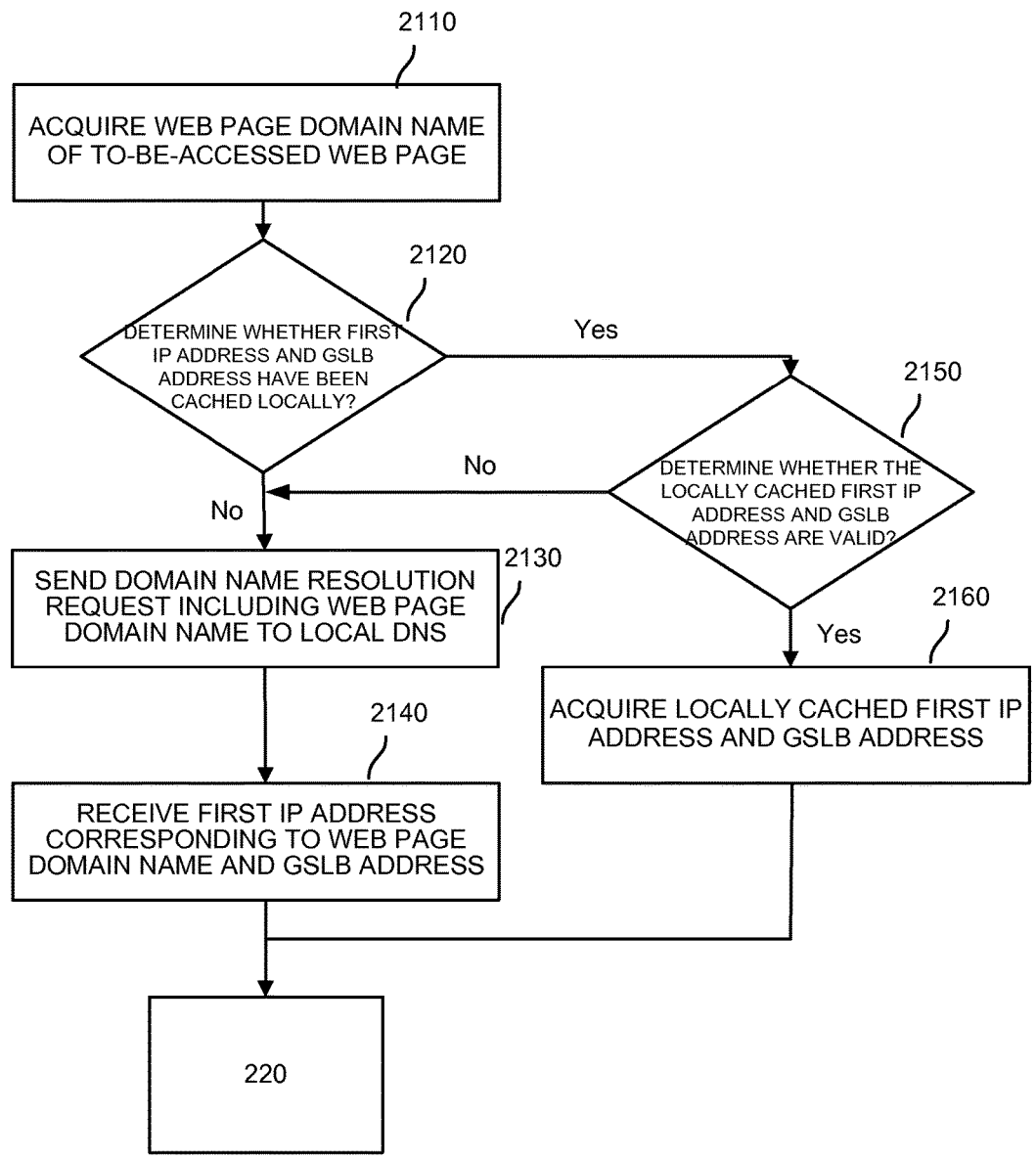
FIG. 4 is a flowchart of an embodiment of a process for acquiring a first IP address corresponding to a web page domain name of a to-be-accessed web page.

FIG. 4 is a flowchart of an embodiment of a process for acquiring a first IP address corresponding to a web page domain name of a to-be-accessed web page. In some embodiments, the process 2100 is an implementation of operation 210 of FIG. 3 and comprises:

In 2110, the browser acquires the web page domain name of the to-be-accessed web page. In some embodiments, the web page domain name is acquired when the user enters the web page domain name into the browser or otherwise selects the web page domain name from a link, bookmark, etc.

In 2120, the browser determines whether the first IP address corresponding to the web page domain name and the GSLB address have been cached locally. In the event that either the first IP address or the GSLB address have not been cached locally, control is passed to operation 2130; otherwise, control is passed to operation 2150.

In 2130, the browser sends a domain name resolution request including the web page domain name to a local DNS to cause the local DNS to acquire the first IP address corresponding to the web page domain name and a GSLB address after the local DNS has received the domain name resolution request.

The local DNS is typically configured by an operator of the network to be used by the user.

Figure 5:
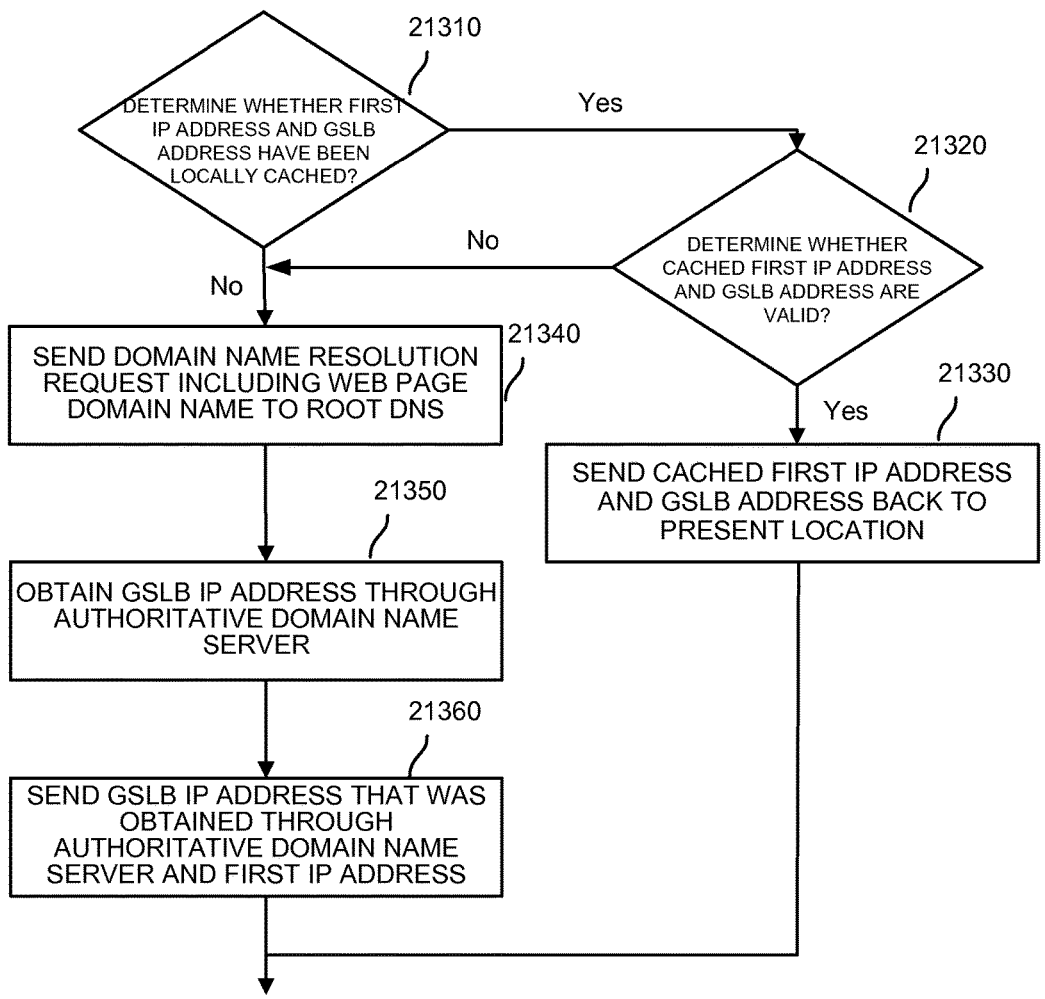
FIG. 5 is a flowchart of an embodiment of a process for acquiring a first IP address corresponding to a web page domain name and a global server load balancer address after the local DNS has received a domain name resolution request.

FIG. 5 is a flowchart of an embodiment of a process for acquiring a first IP address corresponding to a web page domain name and a global server load balancer address after the local DNS has received a domain name resolution request. In some embodiments, the process 21300 is an implementation of operation 2130 of FIG. 4 and comprises:

In 21310, the local DNS determines whether the first IP address corresponding to the web page domain name and the GSLB address have been locally cached. In the event that the first IP address and the GSLB address have been locally cached, control is passed to operation 21320; otherwise, control is passed to operation 21340.

In 21320, the local DNS determines whether the cached first IP address corresponding to the web page domain name and the GSLB address are valid. In the event that the cached first IP address corresponding to the web page domain name and the GSLB address are valid, control is passed to operation 21330; otherwise, control is passed to operation 21340.

When neither a caching time of the cached first IP address corresponding to the web page domain name nor a caching time of the GSLB address does not exceed their respective preset valid time threshold values, the cached first IP address corresponding to the web page domain name and the GSLB address are valid; otherwise, the cached first IP address corresponding to the web page domain name or the cached GSLB address or both are invalid.

In 21330, the local DNS sends the cached first IP address corresponding to the web page domain name and the GSLB address back to the present location (for example, the browser).

In 21340, the local DNS sends a domain name resolution request including the web page domain name to a root domain name server (root DNS) and acquires an authoritative name server through the root domain name server.

In one example, the root domain name server typically does not provide A (address) record resolution service for designated domain names, but instead sends back name server (NS) records for the relevant domain names (e.g., ns1.example.cn, ns2.example.cn for example.cn). In some embodiments, the NS records are domain name server records for designating which DNS servers resolve the domain names. The root domain name server instructs the local DNS to request resolution from the servers for the relevant NS records. Depending on the situation, this process can be repeated more than one time. Lastly, the local DNS obtains the authoritative domain name server for the final service (e.g., example.cn).

In 21350, the local DNS obtains the GSLB IP address through the authoritative domain name server. The first IP address corresponding to the web page domain name can be obtained by the GSLB resolving the web page domain name included in the domain name resolution request.

In one example, the authoritative name server can designate itself as the GSLB, or can designate another server as the GSLB.

The GSLB performs load balancing among multiple CDN nodes and locates a CDN node which is optimal for accessing the web page based on the IP address of the request source (the IP address of the local DNS) or the client IP address. The GSLB takes the IP address of the located CDN node as the IP address corresponding to the web page domain name.

In 21360, the local DNS sends the GSLB IP address that was obtained through the authoritative domain name server and the first IP address that corresponds to the web page domain name and that was obtained by the GSLB back to the present location. Moreover, the local DNS caches the GSLB IP address and the first IP address corresponding to the web page domain name in the local DNS.

The GSLB IP address and the first IP address corresponding to the web page domain name are cached in the local DNS for use by the next same query request.

Referring back to FIG. 4, in 2140, the browser receives the first IP address corresponding to the web page domain name and the GSLB address, which are sent back by the local DNS.

Referring back to FIG. 3, in operation 220, the browser sends an HTTP request including the first IP address to the web server. As a result, after receiving the HTTP request, the web server looks up a web page basic framework corresponding to the first IP address, analyzes the web page basic framework, obtains domain names for web page-referenced content corresponding to the first IP address, and sends a domain name resolution request to the global load balance server (GSLB).

The browser sends an HTTP request including the first IP address and the GSLB address to the web server. As a result, after receiving the HTTP request, the web server looks up the web page basic framework corresponding to the first IP address, analyzes the web page basic framework, obtains domain names for the web page-referenced content corresponding to the first IP address, and sends a domain name resolution request to the global load balance server (GSLB) corresponding to the GSLB address.

Referring back to FIG. 4, in 2150, the browser determines whether the locally cached first IP address corresponding to the web page domain name and the GSLB address are valid. In the event that the locally cached first IP address corresponding to the web page domain name and the GSLB address are valid, control is passed to operation 2160; otherwise, control is passed to operation 2130. For example, a web page domain name or GSLB address being valid corresponds to a record existing for the web page domain name or GSLB address and a time to live (TTL) being more than 0.

As an example, the browser first determines whether a first IP address record corresponding to the web page domain name has been cached in the local browser DNS cache. In the event that the first IP address record has been cached, the browser determines whether the cached first IP address corresponding to the web page domain name is valid. In the event that the cached first IP address corresponding to the web page domain name is valid, control is passed to operation 2160. In the event that the first IP address corresponding to the web page domain name has not been cached in the local browser DNS, or the cached first IP address corresponding to the web page domain name is invalid, the browser determines, based on the operating system, whether a record of the first IP address corresponding to the web page domain name has been cached in the host file (e.g., in a Linux operating system: /etc/hosts, in a Windows operating system: % SystemRoot %\system32\drivers\etc\hosts) of the local operating system. In the event that the first IP address corresponding to the web page domain name has been cached, the browser determines whether the cached first IP address corresponding to the web page domain name is valid. In the event that the cached first IP address corresponding to the web page domain name is valid, control is passed to operation 2160. In the event that the first IP address corresponding to the web page domain name has not been cached in the host file of the local operating system, or the cached first IP address corresponding to the web page domain name is invalid, then control is passed to operation 2130.

In some embodiments, when, in the above process, the caching time of the cached first IP address corresponding to the web page domain name does not exceed a preset valid time threshold value, the cached first IP address corresponding to the web page domain name is valid; otherwise, the cached first IP address corresponding to the web page domain name is invalid.

In 2160, the browser acquires the locally cached first IP address corresponding to the web page domain name and the GSLB address.

Referring back to FIG. 3, after operation 2160 of FIG. 4 is performed, in 220, the browser sends an HTTP request including the first IP address to a web server. As a result, after receiving the HTTP request, the web server looks up a web page basic framework corresponding to the first IP address, analyzes the web page basic framework, obtains domain names for web page-referenced content corresponding to the first IP address, and sends a domain name resolution request to a global load balance server (GSLB).

In some embodiments, the browser sends the HTTP request including the first IP address and GSLB address to the web server. As a result, after receiving the HTTP request, the web server looks up the web page basic framework corresponding to the first IP address, analyzes the web page basic framework, obtains the domain names for the web page-referenced content corresponding to the first IP address, and sends the domain name resolution request to the global load balance server (GSLB) corresponding to the GSLB address.

The process 200 for acquiring web pages includes: when the web page includes multiple web page-referenced content, issuing multiple domain name resolution requests is not needed. Time to acquire the web page-referenced content is reduced, which increases web page acquisition efficiency and can speed up web page loading. Scheduling is performed based on the true IP address of the user, which greatly increases scheduling accuracy. DNS resolution is performed through a web server instead of through the traditional client model. Typically, resolution time between the web server and the GSLB will be less than the time associated with client-issued resolution. Web page loading speed can be increased.

Figure 6:
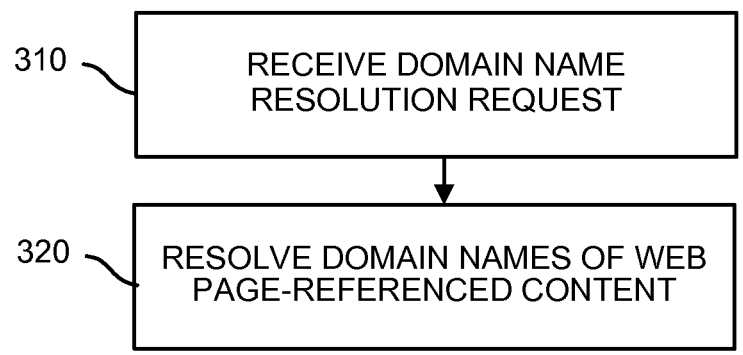
FIG. 6 is a functional block diagram of an embodiment of a process for acquiring web pages.

FIG. 6 is a functional block diagram of an embodiment of a process for acquiring web pages. In some embodiments, the process 300 is implemented by the GSLB 730 of FIG. 7 and comprises:

In 310, the GSLB receives a domain name resolution request, the domain name resolution request including domain names of web page-referenced content in a to-be-accessed web page and a user IP address of a browser corresponding to the to-be-accessed web page.

In 320, the GSLB resolves the domain names of the web page-referenced content, and combines the user IP address with the present location's own scheduling algorithm to obtain a second IP address of each web page-referenced content corresponding to a domain name for each web page-referenced content among the domain names of the web page-referenced content.

After obtaining the second IP address of each web page-referenced content corresponding to the domain name for the each web page-referenced content among the domain names of the web page-referenced content, the GSLB sends the second IP address of each web page-referenced content corresponding to the domain name of each web page-referenced content to a web server, causes the web server to send the second IP address of each web page-referenced content and the web page basic framework corresponding to the first IP address to the browser, the first IP address corresponding to the web page domain name of the to-be-accessed web page, and causes the browser to acquire the web page and display the acquired web page.

The process 300 for resolving domain name web pages includes: when the web page includes multiple web page-referenced content, issuing domain name resolution requests on multiple occasions is not necessary. Acquiring the web page-referenced content takes less time, which increases web page acquisition efficiency and can speed up web page loading. Scheduling, based on the true IP address of the user, greatly increases scheduling accuracy. DNS resolution is achieved through a web server instead of through the traditional client model. Typically, the resolution time between the web server and the GSLB is less than the time associated with client-issued resolution, and web page loading speed can be increased.

Figure 7:
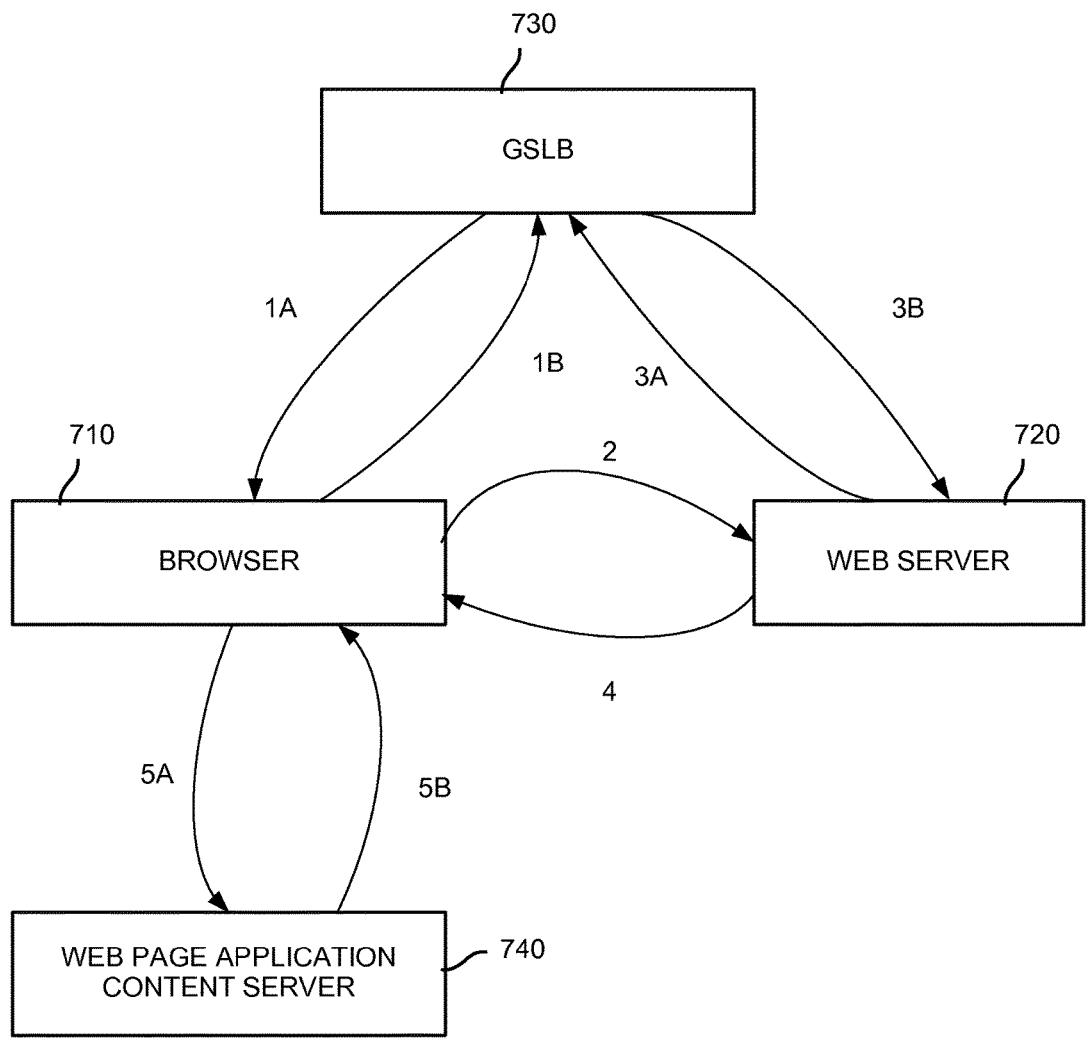
FIG. 7 is a flowchart of an embodiment of a process for resolving a domain name.

FIG. 7 is a flowchart of an embodiment of a process for resolving a domain name. In some embodiments, the process 700 is performed by a browser 710, a web server 720, a GSLB 730, and a web page application content server 740.

In some embodiments, a browser 710 issues a normal domain name resolution request for a web page (e.g., www.example.cn) to complete the domain name resolution process via a GSLB 730. For example, browser 710 sends a domain name resolution request that has the form of a DNS request, for example, "www.example.cn IN A" to GSLB 730 (1B). The GSLB returns a domain name resolution result that has the form of a DNS Answer Message, for example, "www.example.cn. 60 IN A 223.5.5.1" to browser 710 (1A). The browser 710 issues an HTTP request to a web server (2) based on the domain name resolution result sent back by the DNS or GSLB. For example, browser 710 issues an HTTP request that has the form of "GET http://www.example.cn/ HTTP/1.0" to the web server 720. The web server 720, based on its own configuration files, the web page content requiring service, and other such information, looks up a web page basic framework, obtains domain names of web page application content (e.g., img01.excdn.cn, img02.excdn.cn, static.excdn.cn, etc.), and issues, based on EDNS, HTTP, or other such approach, a domain name resolution request including the domain names of the web page-referenced content to the GSLB 730. Moreover, because what is linked to the web server 720 is the true IP address of the user, the web server 720 can also include the true IP address of the user in the domain name resolution request and send the domain name resolution request to the GSLB 730 (3A). An example of such a domain name resolution request using the true IP address of 10.1.1.2. of the user (3A) is GET/ img01.excdn.cn HTTP/1.1\r\nClient-IP: 10.1.1.2. The GSLB, integrating the user's true IP address conveyed by the web server with its own scheduling algorithm, sends the resolution result back to the web server 720 (3B). An example of such a resolution result (3B) is img01.excdn.cn, 60,A,223.5.6.7. The web server 720 sends the resolution result back to the browser 710 (4). An example of the result being returned (4) is X-GSLB-INFO: img01.excdn.cn,60,A, 223.5.6.7;img02.excdn.cn,60,A,223.5.6.8|223.5.6.9 (self-defined HTTP header). The browser 710 directly issues a request (5A) to a network application content server 740 (such as an image web server) based on the relevant resolution result in the web page and receives a response (5B). An example of the request (5A) issued by the browser corresponds to a conventional request, and an example of the response that is received (5B) corresponds to a conventional response. Conducting multiple DNS resolutions for multiple relevant domain names is no longer needed.

Figure 8A:
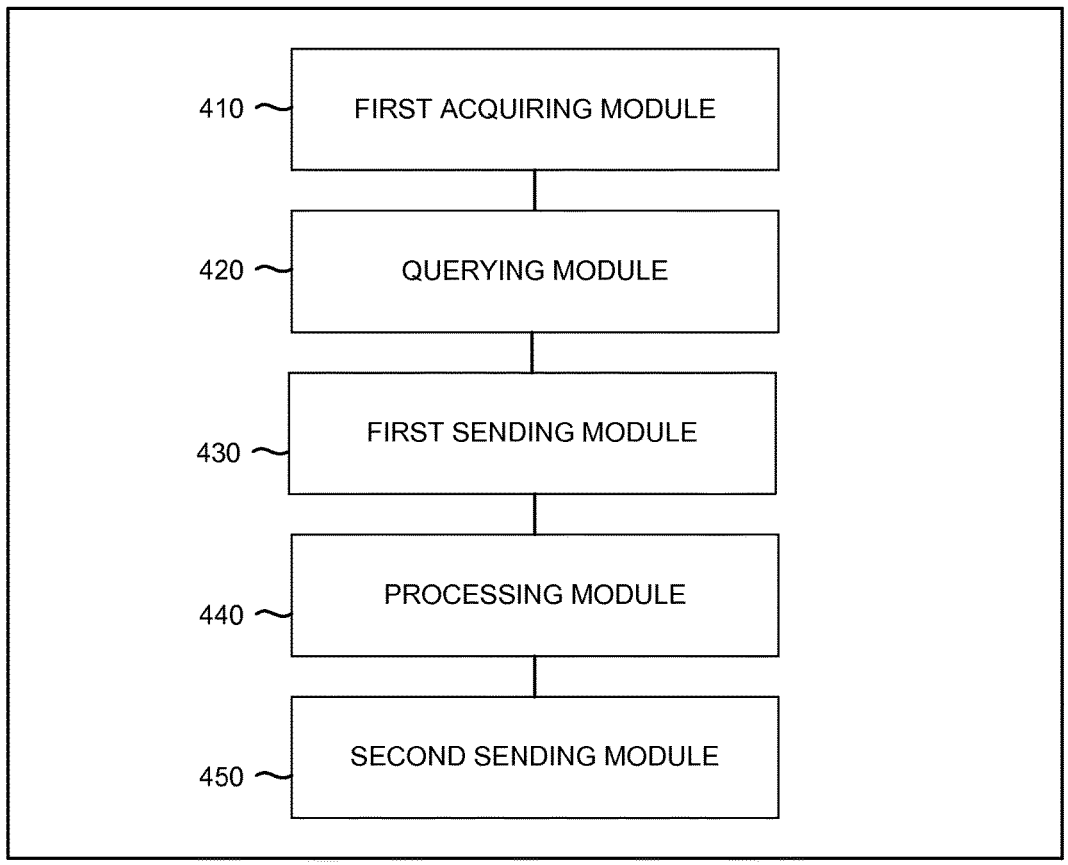
FIG. 8A is a structural diagram of an embodiment of a web server for acquiring web pages.

FIG. 8A is a structural diagram of an embodiment of a web server for acquiring web pages. In some embodiments, the web server 400 is configured to perform process 100 of FIG. 2 and comprises: a first acquiring module 410, a querying module 420, a first sending module 430, a processing module 440, and a second sending module 450.

In some embodiments, the first acquiring module 410 acquires a hypertext transfer protocol (HTTP) request including a first network protocol (IP) address.

In some embodiments, the querying module 420 looks up a web page basic framework corresponding to the first IP address, analyzes the web page basic framework, and obtains domain names of web page-referenced content corresponding to the first IP address.

In some embodiments, the first sending module 430 sends a domain name resolution request to a global server load balancer (GSLB), the domain name resolution request including the domain names of the web page-referenced content.

In some embodiments, the processing module 440 acquires, from the GSLB, a second IP address of each web page-referenced content.

In some embodiments, the second IP address of the each web page-referenced content corresponds to a domain name for each web page-referenced content among the domain names of the web page-referenced content.

In some embodiments, the second sending module 450 sends a web page basic framework and the second IP address of each web page-referenced content to a browser to cause the browser to acquire the web page and to display the acquired web page.

In some embodiments, the first acquiring module 410 is further configured to acquire the HTTP request including the first IP address and the GSLB address.

Figure 8B:
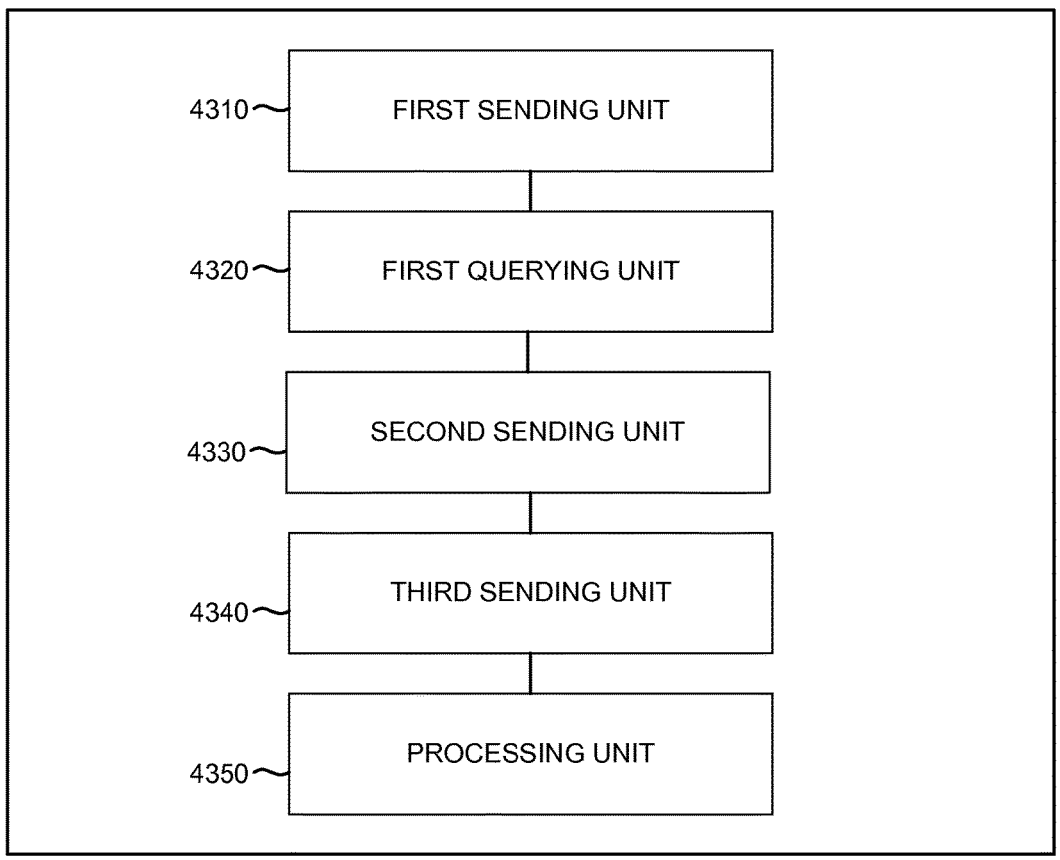
FIG. 8B is a structural diagram of an embodiment of a first sending module.

FIG. 8B is a structural diagram of an embodiment of a first sending module. In some embodiments, the first sending module 4300 is an implementation of the first sending module 430 of FIG. 8A and comprises: a first sending unit 4310, a first querying unit 4320, a second sending unit 4330, a third sending unit 4340, and a processing unit 4350.

In some embodiments, the first sending unit 4310 sends a domain name resolution request to the GSLB corresponding to the GSLB address.

In some embodiments, the first querying unit 4320 looks up local GSLB configuration information and obtains the GSLB address corresponding to the present location. In some embodiments, the GSLB configuration information includes the GSLB address corresponding to the present location.

In some embodiments, the second sending unit 4330 sends a domain name resolution request to the GSLB corresponding to the GSLB address.

In some embodiments, the third sending unit 4340 sends the domain name resolution request to the GSLB based on an extended domain name server (EDNS) or HTTP.

Furthermore, the HTTP request is issued by the browser after the browser acquires a first IP address corresponding to a web page domain name of the to-be-accessed web page.

In some embodiments, the processing unit 4350 sends a domain name resolution request to the global load balancer (GSLB).

In some embodiments, the domain resolution request includes domain names of the web page-referenced content, and after issuing the user IP address of the browser of the HTTP request with the result that the GSLB receives the domain name resolution request, resolving the domain names of all web page-referenced content, and combining the user IP address with the GSLB's own scheduling algorithm, the processing unit 4350 obtains a second IP address of each web page-referenced content corresponding to a domain name for each web page-referenced content among the domain names of the web page-referenced content.

Please note that, in some embodiments, one of the functions of a web server, which is also called a WWW (World Wide Web) server, is to provide online information browsing services. Original content handlers (original content parsers), content handlers (content parsers), GSLB clients, and final content handlers (final content parsers) can be set up in the web server. The functions of the first acquiring module and the querying module in looking up the web page basic framework corresponding to the first IP address are implemented through an original content handler; the query module's function includes analyzing the web page basic framework to obtain the domain names of the web page-referenced content corresponding to the first IP address implemented through a content handler; the functions of the first sending module and the functions of the processing module are implemented through a GSLB client; and the functions of the second sending module are implemented through a final content handler.

The web server includes: when the web page includes multiple web page-referenced content, issuing multiple domain name resolution requests is not needed. Acquiring the web page-referenced content takes less time, which increases web page acquisition efficiency and can speed up web page loading. Scheduling is based on the true IP address of the user, which greatly increases scheduling accuracy. DNS resolution is achieved through a web server instead of through the traditional client model. Typically, resolution time between the web server and the GSLB will be less than the time associated with client-issued resolution, and web page loading speed can be increased.

Figure 9A:
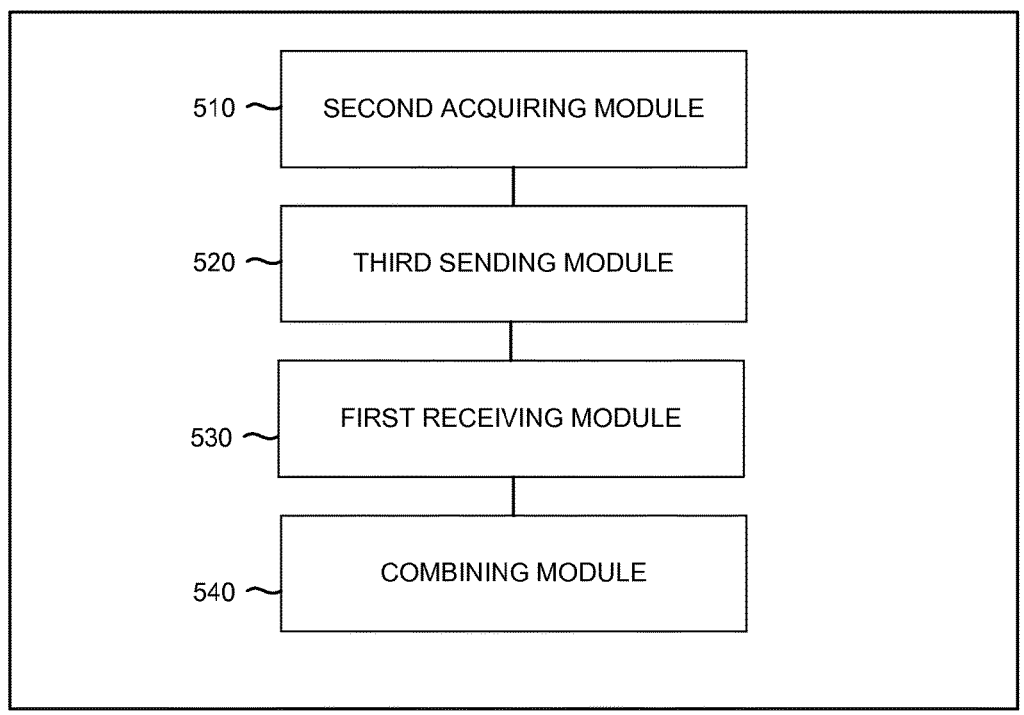
FIG. 9A is a structural diagram of an embodiment of a browser for acquiring web pages.

FIG. 9A is a structural diagram of an embodiment of a browser for acquiring web pages. In some embodiments, the browser 500 implements the process 200 of FIG. 3 and comprises: a second acquiring module 510, a third sending module 520, a first receiving module 530, and a combining module 540.

In some embodiments, the second acquiring module 510 acquires a first IP address corresponding to a web page domain name of a to-be-accessed web page.

In some embodiments, after sending an HTTP request for the first IP address to a web server with the result that the web server receives the HTTP request, the third sending module 520 looks up the web page basic framework corresponding to the first IP address, analyzes a web page basic framework, obtains domain names for web page-referenced content corresponding to the first IP address, and sends a domain name resolution request to the global load balancer (GSLB), the domain name resolution request including the domain names of the web page-referenced content.

In some embodiments, the first receiving module 530 receives a web page basic framework sent by the web server and a second IP address of each web page-referenced content forwarded by the web server and obtained by the GSLB, the second IP address of each web page-referenced content corresponding to a domain name for each web page-referenced content among the domain names of the web page-referenced content.

In some embodiments, the combining module 540 acquires the each web page-referenced content from each web page-referenced content server corresponding to the second IP address of the each web page-referenced content, and combines the web page basic framework with the each web page-referenced content to obtain a web page.

Figure 9B:
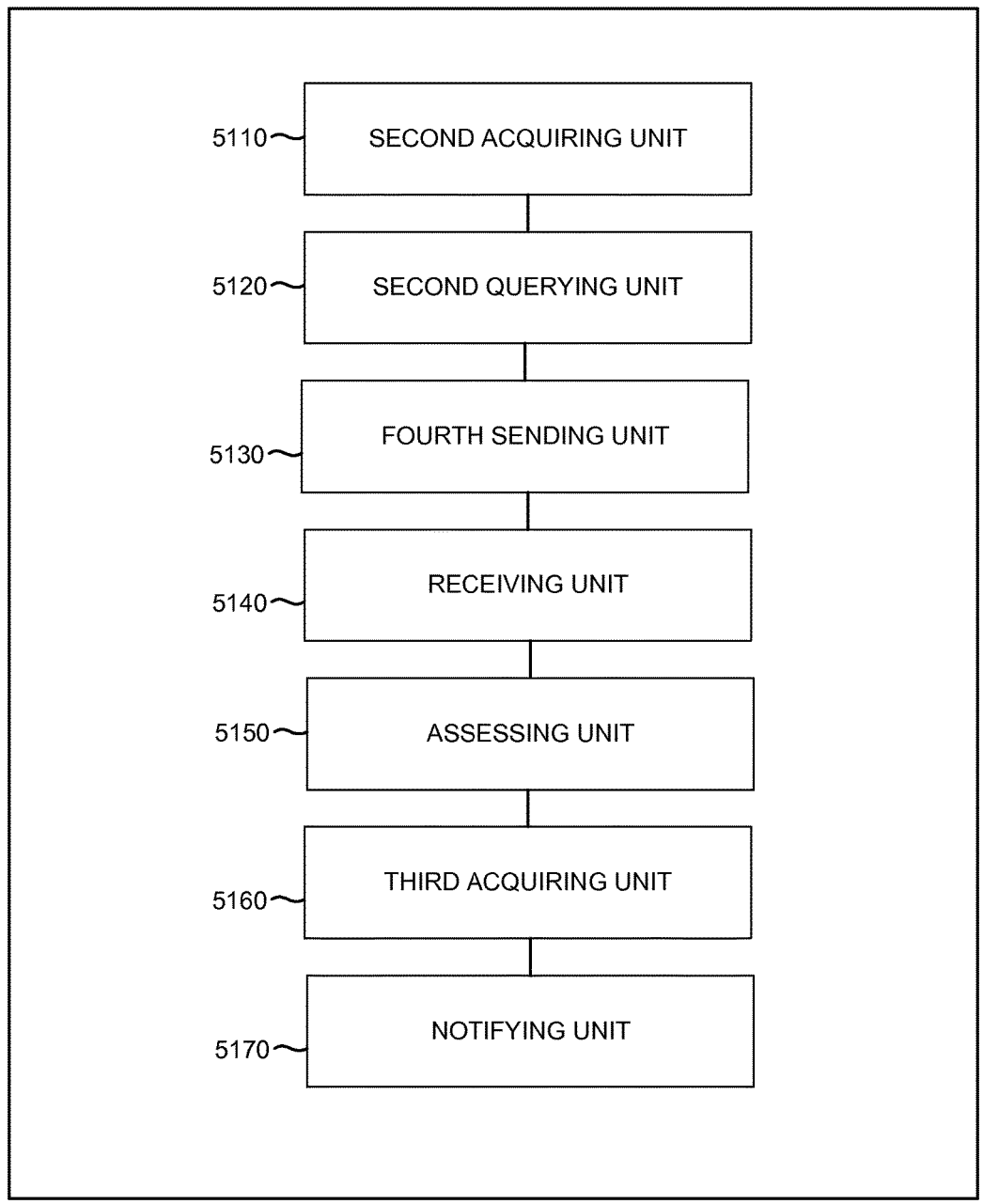
FIG. 9B is a structural diagram of an embodiment of a second acquiring module.

FIG. 9B is a structural diagram of an embodiment of a second acquiring module. In some embodiments, the second acquiring module 5100 is an implementation of the second acquiring module 510 of FIG. 9A and comprises: a second acquiring unit 5110, a second querying unit 5120, a fourth sending unit 5130, a receiving unit 5140, an assessing unit 5150, and a third acquiring unit 5160.

In some embodiments, the second acquiring unit 5110 acquires the web page domain name of the to-be-accessed web page.

In some embodiments, the second querying unit 5120 determines whether the first IP address corresponding to the web page domain name and the GSLB address have been locally cached.

In some embodiments, the fourth sending unit 5130, in the event that the query result of the second querying unit 5120 is not cached, sends a domain name resolution request including the web page domain name to the local domain name server (DNS), causes the local DNS to acquire the first IP address corresponding to the web page domain name and a GSLB address after the local DNS has received the domain name resolution request.

In some embodiments, the receiving unit 5140 receives the first IP address corresponding to the web page domain name and the GSLB address, which are sent back by the local DNS.

Figure 9C:
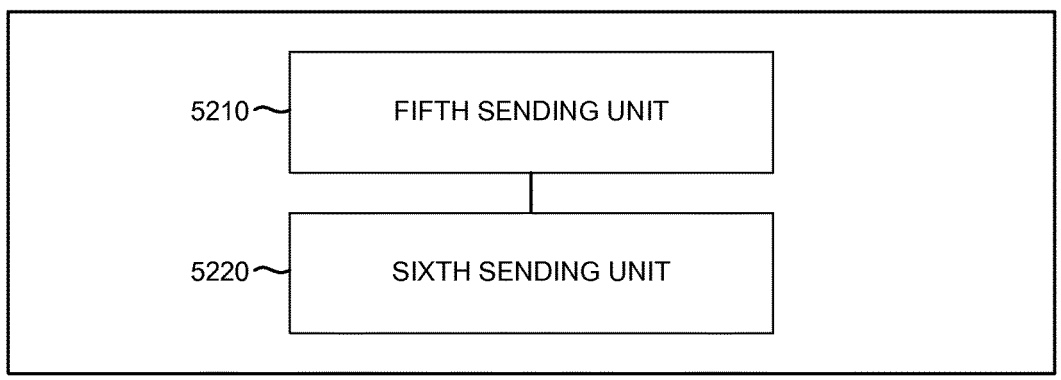
FIG. 9C is a structural diagram of an embodiment of a third sending module.

FIG. 9C is a structural diagram of an embodiment of a third sending module. In some embodiments, the third sending module 5200 is an implementation of the third sending module 520 of FIG. 9A and comprises: a fifth sending unit 5210.

In some embodiments, the fifth sending unit 5210 sends an HTTP request including the first IP address and the GSLB address to the web server. As a result, after receiving the HTTP request, the web server looks up the web page basic framework corresponding to the first IP address, analyzes the web page basic framework, obtains domain names for the web page-referenced content corresponding to the first IP address, and sends a domain name resolution request to the global load balance server (GSLB) corresponding to the GSLB address.

Referring back to FIG. 9B, in some embodiments, the assessing unit 5150, if the query result of the second querying unit has been cached, determines whether the locally cached first IP address corresponding to the web page domain name and the GSLB address are valid.

In some embodiments, the third acquiring unit 5160, if the assessment result of the assessing unit 5150 is valid, acquires the locally cached first IP address corresponding to the web page domain name and the GSLB address.

Referring back to FIG. 9C, in some embodiments, the third sending module 5200 further comprises a sixth sending unit 5220.

In some embodiments, the sixth sending unit 5220 sends an HTTP request including the first IP address and the GSLB address to the web server. As a result, after receiving the HTTP request, the web server looks up the web page basic framework corresponding to the first IP address, analyzes the web page basic framework, obtains domain names for all web page-referenced content corresponding to the first IP address, and sends a domain name resolution request to the global load balance server (GSLB) corresponding to the GSLB address.

Referring back to FIG. 9B, in some embodiments, the second acquiring module 5100 further comprises a notifying unit 5170.

In some embodiments, the notifying unit 5170, if the assessment result of the assessing unit 5150 is not valid, notifies the fourth sending unit 5130 to send a domain name resolution request including the web page domain name to the local DNS.

Please note that the browsers include Internet Explorer, Firefox, Chrome, and other such browsers, wget and other command-line tools, specialized apps for mobile phones and computers, and squid and other proxy servers. GSLB handlers (GSLB Parse) and domain name caches (DNS cache) can be set up in a browser. The functions of the first receiving module and the combining module can be implemented through a GSLB handler. The first IP address that was obtained by the second acquiring module and that corresponds to the web page domain name of the to-be-accessed web page can be cached in the domain name cache. In some embodiments, the functions of the second acquiring module and the third sending module are implemented through a traditional domain name client (traditional DNS client) (including DNS resolving and caching modules in the client operating system) in the client computer. The client computer can use an operating system such as Windows, Linux, Mac OS, iOS, Android, etc. The browser is run on the client computer.

The browser 500 as described includes: when the web page includes multiple web page-referenced content, issuing multiple domain name resolution requests is not required. Acquiring the web page-referenced content takes less time, which increases web page acquisition efficiency and can speed up web page loading. Scheduling is based on the true IP address of the user, which greatly increases scheduling accuracy. DNS resolution is achieved through a web server instead of through the traditional client model. Typically, the resolution time between the web server and the GSLB will be less than the time associated with client-issued resolution. Accordingly, web page loading speed can be increased.

Figure 10:
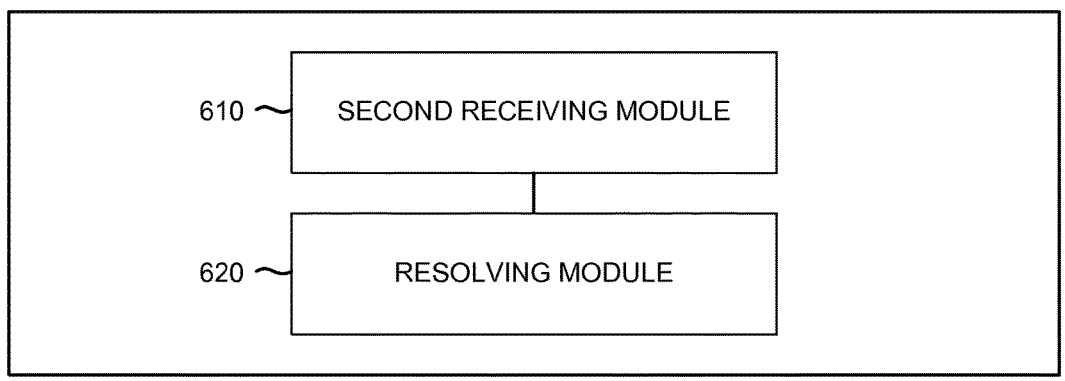
FIG. 10 is a structural diagram of an embodiment of a Global Server Load Balancer for acquiring web pages.

FIG. 10 is a structural diagram of an embodiment of a Global Server Load Balancer for acquiring web pages. In some embodiments, the global server load balancer (GSLB) 600 implements the process 300 of FIG. 6 and comprises: a second receiving module 610 and a resolving module 620.

In some embodiments, the second receiving module 610 receives a domain name resolution request, the domain name resolution request including domain names of web page-referenced content in a to-be-accessed web page and a user IP address of a browser corresponding to the to-be-accessed web page.

In some embodiments, the resolving module 620 resolves the domain names of the web page-referenced content, and combines the user IP address with the present location's own scheduling algorithm to obtain the second IP address of each web page-referenced content corresponding to a domain name for each web page-referenced content among the domain names of the web page-referenced content.

Figure 11:
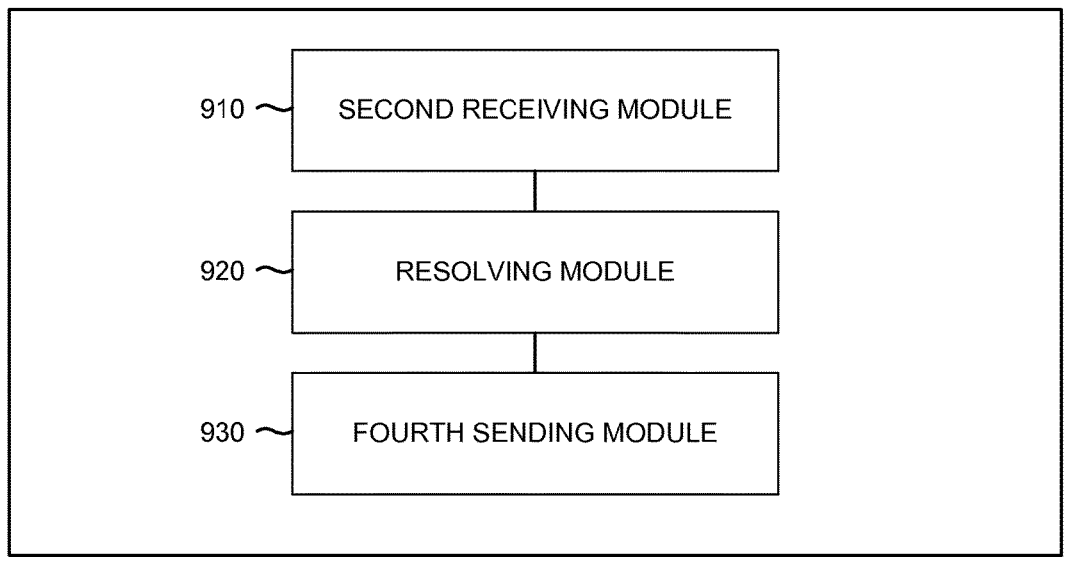
FIG. 11 is a structural diagram of another embodiment of a Global Server Load Balancer for acquiring web pages.

FIG. 11 is a structural diagram of another embodiment of a Global Server Load Balancer for acquiring web pages. In some embodiments, the global load balancer (GSLB) 900 implements the process 300 of FIG. 6 and comprises: a second receiving module 910, a resolving module 920, and a fourth sending module 930.

In some embodiments, the second receiving module 910 and the resolving module 920 correspond to the second receiving module 610 and the resolving module 620 of FIG. 10, respectively.

In some embodiments, the fourth sending module 930 sends the second IP address of each web page-referenced content corresponding to a domain name of each web page-referenced content to a web server, causes the web server to send the second IP address of each web page-referenced content and the web page basic framework corresponding to the first IP address to a browser, the first IP address corresponding to the web page domain name of the to-be-accessed web page, and causes the browser to acquire the web page and display the web page.

Please note that GSLBs achieve traffic scheduling on wide-area networks (including the Internet) between servers in different areas. The GSLBs ensure access quality by guaranteeing that a client uses nearest optimal server services. A scheduling policy database (policy DB) (scheduling policy databases include scheduling algorithms) and a HTTPDNS processor or EDNS processor is set up in a GSLB. The functions of the second receiving module, the resolving module, and the fourth sending module can be implemented through the HTTPDNS processor or the EDNS processor.

The described GSLB, when the web page contains multiple web page-referenced content, does not need to issue multiple domain name resolution requests. Acquiring the web page-referenced content takes less time, which increases web page acquisition efficiency and can speed up web page loading. Scheduling is based on the true IP address of the user, which greatly increases scheduling accuracy. DNS resolution is achieved through a web server instead of through the traditional client model. Typically, the resolution time between the web server and the GSLB will be less than the time associated with client-issued resolution, and web page loading speed can be increased.

The modules and units described above can be implemented as software components executing on one or more general purpose processors, as hardware such as programmable logic devices and/or Application Specific Integrated Circuits designed to perform certain functions or a combination thereof. In some embodiments, the modules and units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods and units described in the embodiments of the present invention. The modules and/or units may be implemented on a single device or distributed across multiple devices. The functions of the modules and/or units may be merged into one another or further split into multiple sub-modules and/or sub-units.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Figure 12:
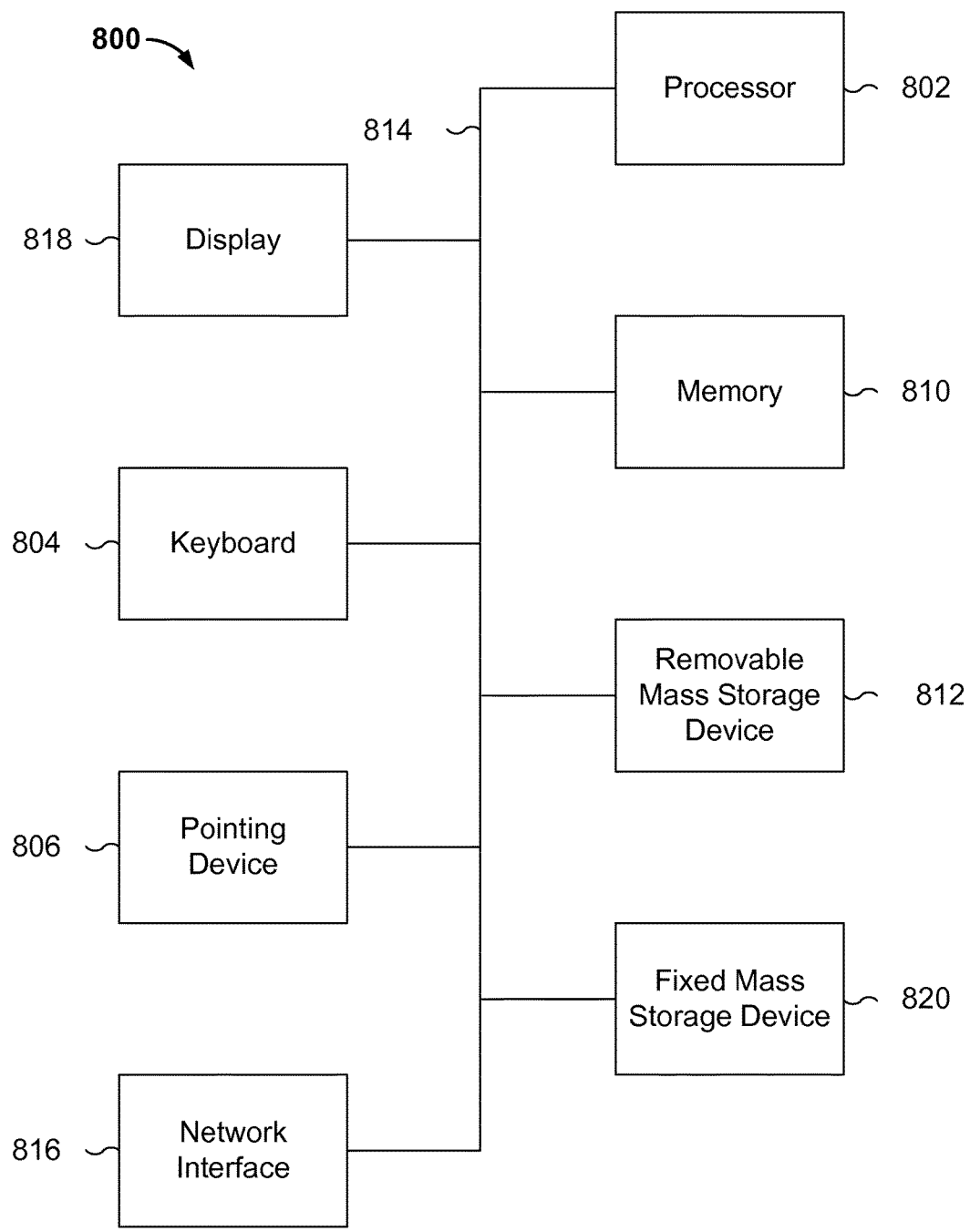
FIG. 12 is a functional diagram illustrating an embodiment of a programmed computer system for acquiring web pages.

FIG. 12 is a functional diagram illustrating an embodiment of a programmed computer system for acquiring web pages. As will be apparent, other computer system architectures and configurations can be used to acquire web pages. Computer system 800, which includes various subsystems as described below, includes at least one microprocessor subsystem (also referred to as a processor or a central processing unit (CPU)) 802. For example, processor 802 can be implemented by a single-chip processor or by multiple processors. In some embodiments, processor 802 is a general purpose digital processor that controls the operation of the computer system 800. Using instructions retrieved from memory 810, the processor 802 controls the reception and manipulation of input data, and the output and display of data on output devices (e.g., display 818).

Processor 802 is coupled bi-directionally with memory 810, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 802. Also as is well known in the art, primary storage typically includes basic operating instructions, program code, data and objects used by the processor 802 to perform its functions (e.g., programmed instructions). For example, memory 810 can include any suitable computer-readable storage media, described below, depending on whether, for example, data access needs to be bi-directional or uni-directional. For example, processor 802 can also directly and very rapidly retrieve and store frequently needed data in a cache memory (not shown).

A removable mass storage device 812 provides additional data storage capacity for the computer system 800, and is coupled either bi-directionally (read/write) or uni-directionally (read only) to processor 802. For example, storage 812 can also include computer-readable media such as magnetic tape, flash memory, PC-CARDS, portable mass storage devices, holographic storage devices, and other storage devices. A fixed mass storage 820 can also, for example, provide additional data storage capacity. The most common example of mass storage 820 is a hard disk drive. Mass storages 812, 820 generally store additional programming instructions, data, and the like that typically are not in active use by the processor 802. It will be appreciated that the information retained within mass storages 812 and 820 can be incorporated, if needed, in standard fashion as part of memory 810 (e.g., RAM) as virtual memory.

In addition to providing processor 802 access to storage subsystems, bus 814 can also be used to provide access to other subsystems and devices. As shown, these can include a display monitor 818, a network interface 816, a keyboard 804, and a pointing device 806, as well as an auxiliary input/output device interface, a sound card, speakers, and other subsystems as needed. For example, the pointing device 806 can be a mouse, stylus, track ball, or tablet, and is useful for interacting with a graphical user interface.

The network interface 816 allows processor 802 to be coupled to another computer, computer network, or telecommunications network using a network connection as shown. For example, through the network interface 816, the processor 802 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 802 can be used to connect the computer system 800 to an external network and transfer data according to standard protocols. For example, various process embodiments disclosed herein can be executed on processor 802, or can be performed across a network such as the Internet, intranet networks, or local area networks, in conjunction with a remote processor that shares a portion of the processing. Additional mass storage devices (not shown) can also be connected to processor 802 through network interface 816.

An auxiliary I/O device interface (not shown) can be used in conjunction with computer system 800. The auxiliary I/O device interface can include general and customized interfaces that allow the processor 802 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 12 is but an example of a computer system suitable for use with the various embodiments disclosed herein. Other computer systems suitable for such use can include additional or fewer subsystems. In addition, bus 814 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
acquiring a hypertext transfer protocol (HTTP) request from a browser, the HTTP request including a first Internet protocol (IP) address;
looking up a web page basic framework corresponding to the first IP address;
analyzing, at a web server, the web page basic framework for web page-referenced content to thereby obtain a plurality of domain names corresponding to a plurality of pieces of web page-referenced content;
sending, via a global server load balancer (GSLB) address of a GSLB, a domain name resolution request to the GSLB, wherein the domain name resolution request includes the plurality of domain names obtained by analyzing the web page basic framework, wherein the domain name resolution request includes the plurality of domain names of the plurality of pieces of web page-referenced content and the client IP address associated with the browser that issued the HTTP request, and wherein the GSLB is configured to resolve the plurality of domain names of the plurality of pieces of web page-referenced content and combine the client IP address with a scheduling algorithm of the GSLB to obtain the plurality of second IP addresses of the plurality of pieces of web page-referenced content;
acquiring, from the GSLB, a plurality of second IP addresses for the plurality of pieces of web page-referenced content, wherein a respective second IP address of a respective piece of web page-referenced content corresponds to a respective domain name for the respective piece of web page-referenced content, and wherein the GSLB locates the respective second IP address based on a client IP address associated with the browser;

sending, by the web server, the web page basic framework and the plurality of second IP addresses for the plurality of pieces of web page-referenced content to the browser; and causing the browser to acquire a web page based on the web page basic framework and the plurality of second IP addresses, and display the acquired web page.

2. The method as described in claim 1, wherein the acquired HTTP request further comprises the GSLB address, and an address of the GSLB to which the domain name resolution request is sent corresponds to the GSLB address.

3. The method as described in claim 1, wherein the sending of the domain name resolution request to the GSLB comprises:

looking up local GSLB configuration information and obtaining the GSLB address corresponding to a present location from which the HTTP request was initiated, wherein the GSLB configuration information includes the GSLB address corresponding to the present location; and sending the domain name resolution request to the GSLB corresponding to the GSLB address.

4. The method as described in claim 1, wherein the sending of the domain name resolution request to the GSLB comprises:

sending the domain name resolution request to the GSLB by using an extended domain name server (EDNS) or HTTP.

5. The method as described in claim 1, wherein the HTTP request is issued by the browser after the browser acquires the first IP address corresponding to a web page domain name of a to-be-accessed web page.

6. A method, comprising:

acquiring a first IP address corresponding to a web page domain name of a to-be-accessed web page;

sending a hypertext transfer protocol (HTTP) request including the first IP address to a web server;

looking up a web page basic framework corresponding to the first IP address;

analyzing, at the web server, the web page basic framework for web page-referenced content to thereby obtain a plurality of domain names corresponding to a plurality of pieces of web page-referenced content;

sending, via a global server load balancer (GSLB) address of a GSLB, a domain name resolution request to the GSLB, wherein the domain name resolution request includes the plurality of domain names obtained by analyzing the web page basic framework, wherein the domain name resolution request includes the plurality of domain names of the plurality of pieces of web page-referenced content and the client IP address associated with the browser that issued the HTTP request, and wherein the GSLB is configured to resolve the plurality of domain names of the plurality of pieces of web page-referenced content and combine the client IP address with a scheduling algorithm of the GSLB to obtain the plurality of second IP addresses of the plurality of pieces of web page-referenced content;

receiving the web page basic framework sent by the web server and a plurality of second IP addresses of the plurality of pieces of web page-referenced content forwarded by the web server and obtained by the GSLB, wherein a second IP address of a respective piece of web page-referenced content corresponds to a respective domain name for the respective piece of web page-referenced content, and wherein the GSLB locates the second IP address based on a local IP address;

acquiring the respective piece of web page-referenced content from a respective web page-referenced content server corresponding to the second IP address of the respective piece of web page-referenced content;

obtaining a web page based on the web page basic framework and the plurality of second IP addresses; and presenting the web page.

7. The method as described in claim 6, wherein the acquiring of the first IP address corresponding to the web page domain name of the to-be-accessed web page comprises:

acquiring the web page domain name of the to-be-accessed web page;

determining whether the first IP address corresponding to the web page domain name and the GSLB address have been locally cached;

in response to a determination that the first IP address corresponding to the web page domain name and the GSLB address have not been locally cached, sending the domain name resolution request including the web page domain name to a local domain name server (DNS) to cause the local DNS to acquire the first IP address corresponding to the web page domain name and the GSLB address after the local DNS has received the domain name resolution request;

receiving the first IP address corresponding to the web page domain name and the GSLB address, which are sent back by the local DNS; and after sending the HTTP request including the first IP address to the web server:

looking up the web page basic framework corresponding to the first IP address;

obtaining the plurality of domain names for the plurality of pieces of web page-referenced content corresponding to the first IP address; and sending the domain name resolution request to the GSLB corresponding to the GSLB address.

8. The method as described in claim 7, further comprising:

after determining whether the first IP address corresponding to the web page domain name and the GSLB address have been locally cached:

in response to the determination that the first IP address corresponding to the web page domain name and the GSLB address have been locally cached:

determining whether the locally cached first IP address corresponding to the web page domain name and the GSLB address are valid; and in response to the determination that the locally cached first IP address corresponding to the web page domain name and the GSLB address are valid, acquiring the locally cached first IP address corresponding to the web page domain name and the GSLB address; and after sending the HTTP request including the first IP address to the web server:

looking up the web page basic framework corresponding to the first IP address;

analyzing the web page basic framework;

obtaining the plurality of domain names for the plurality of pieces of web page-referenced content corresponding to the first IP address; and sending the domain name resolution request to the GSLB corresponding to the GSLB address.

9. The method as described in claim 8, further comprising:
after determining whether the locally cached first IP address corresponding to the web page domain name and the GSLB address are valid:
   in response to a determination that the locally cached first IP address corresponding to the web page domain name and the GSLB address are not valid, sending the domain name resolution request including the web page domain name to the local DNS.

10. A system, comprising:
at least one processor configured to:
   acquire a hypertext transfer protocol (HTTP) request from a browser, the HTTP request including a first Internet protocol (IP) address;
   look up a web page basic framework corresponding to the first IP address;
   analyze, at a web server, the web page basic framework for web page-referenced content to thereby obtain a plurality of domain names corresponding to a plurality of pieces of web page-referenced content;
   send, via a global server load balancer (GSLB) address of a GSLB, a domain name resolution request to the GSLB, wherein the domain name resolution request includes the plurality of domain names obtained by analyzing the web page basic framework, wherein the domain name resolution request includes the plurality of domain names of the plurality of pieces of web page-referenced content and the client IP address associated with the browser that issued the HTTP request, and wherein the GSLB is configured to resolve the plurality of domain names of the plurality of pieces of web page-referenced content and combine the client IP address with a scheduling algorithm of the GSLB to obtain the plurality of second IP addresses of the plurality of pieces of web page-referenced content;
   acquire, from the GSLB, a plurality of second IP addresses for the plurality of pieces of web page-referenced content, wherein a respective second IP address of a respective piece of web page-referenced content corresponds to a respective domain name for the respective piece of web page-referenced content, and wherein the GSLB locates the respective second IP address based on a client IP address associated with the browser;
   send, by the web server, the web page basic framework and the plurality of second IP addresses for the plurality of pieces of web page-referenced content to the browser; and
   cause the browser to acquire a web page based on the web page basic framework and the plurality of second IP addresses, and display the acquired web page; and
a memory coupled to the at least one processor and configured to provide the at least one processor with instructions.

11. The system as described in claim 10, wherein:
the acquired HTTP request further comprises the GSLB address; and
an address of the GSLB to which the domain name resolution request is sent corresponds to the GSLB address.

12. The system as described in claim 10, wherein the sending of the domain name resolution request to the GSLB comprises to:

look up local GSLB configuration information and obtain the GSLB address corresponding to a present location from which the HTTP request was initiated, wherein the GSLB configuration information includes the GSLB address corresponding to the present location; and
send the domain name resolution request to the GSLB corresponding to the GSLB address.

13. The system as described in claim 10, wherein to send the domain name resolution request to the GSLB comprises to:
send the domain name resolution request to the GSLB by using an extended domain name server (EDNS) or HTTP.

14. The system as described in claim 10, wherein the HTTP request is issued by the browser after the browser acquires the first IP address corresponding to a web page domain name of a to-be-accessed web page.

15. A system, comprising:
at least one processor configured to:
   acquire a first IP address corresponding to a web page domain name of a to-be-accessed web page;
   send, via a global server load balancer (GSLB) address of a GSLB, a hypertext transfer protocol (HTTP) request including the first IP address to a web server;
   look up a web page basic framework corresponding to the first IP address;
   analyze, at the web server, the web page basic framework for web page-referenced content to thereby obtain a plurality of domain names corresponding to a plurality of pieces of web page-referenced content;
   send a domain name resolution request to the GSLB, wherein the domain name resolution request includes the plurality of domain names obtained by analyzing the web page basic framework, wherein the domain name resolution request includes the plurality of domain names of the plurality of pieces of web page-referenced content and the client IP address associated with the browser that issued the HTTP request, and wherein the GSLB is configured to resolve the plurality of domain names of the plurality of pieces of web page-referenced content and combine the client IP address with a scheduling algorithm of the GSLB to obtain the plurality of second IP addresses of the plurality of pieces of web page-referenced content;
   receive the web page basic framework sent by the web server and a plurality of second IP addresses of the plurality of pieces of web page-referenced content forwarded by the web server and obtained by the GSLB, wherein a second IP address of a respective piece of web page-referenced content corresponds to a respective domain name for the respective piece of web page-referenced content, and wherein the GSLB locates the second IP address based on a local client IP address;
   acquire the respective piece of web page-referenced content from a respective web page-referenced content server corresponding to the second IP address of the respective piece of web page-referenced content;
   obtain a web page based on the web page basic framework and the plurality of second IP addresses; and
   present the web page; and
a memory coupled to the at least one processor and configured to provide the at least one processor with instructions.

16. The system as described in claim 15, wherein to acquire the first IP address corresponding to the web page domain name of the to-be-accessed web page comprises to:
- acquire the web page domain name of the to-be-accessed web page;
- determine whether the first IP address corresponding to the web page domain name and the GSLB address have been locally cached;
- in response to a determination that the first IP address corresponding to the web page domain name and the GSLB address have not been locally cached, send the domain name resolution request including the web page domain name to a local domain name server (DNS) to cause the local DNS to acquire the first IP address corresponding to the web page domain name and the GSLB address after the local DNS has received the domain name resolution request;
- receive the first IP address corresponding to the web page domain name and the GSLB address, which are sent back by the local DNS; and
- after sending an HTTP request including the first IP address to the web server:
  - look up the web page basic framework corresponding to the first IP address;
  - obtain the plurality of domain names for the plurality of pieces of web page-referenced content corresponding to the first IP address; and
  - send the domain name resolution request to the GSLB corresponding to the GSLB address.

17. The system as described in claim 16, wherein the at least one processor is further configured to:
- after determining whether the first IP address corresponding to the web page domain name and the GSLB address have been locally cached:
  - in response to the determination that the first IP address corresponding to the web page domain name and the GSLB address have been locally cached:
    - determine whether the locally cached first IP address corresponding to the web page domain name and the GSLB address are valid; and
    - in response to the determination that the locally cached first IP address corresponding to the web page domain name and the GSLB address are valid, acquire the locally cached first IP address corresponding to the web page domain name and the GSLB address; and
- after sending the HTTP request including the first IP address to the web server:
  - look up the web page basic framework corresponding to the first IP address;
  - analyze the web page basic framework;
  - obtain the plurality of domain names for the plurality of pieces of web page-referenced content corresponding to the first IP address; and
  - send the domain name resolution request to the GSLB corresponding to the GSLB address.

18. The system as described in claim 17, wherein the at least one processor is further configured to:
- after determining whether the locally cached first IP address corresponding to the web page domain name and the GSLB address are valid:
  - in response to a determination that the locally cached first IP address corresponding to the web page domain name and the GSLB address are not valid, send the domain name resolution request including the web page domain name to the local DNS.

* * * * *